United States Patent
Peacock

(10) Patent No.: US 6,928,504 B2
(45) Date of Patent: Aug. 9, 2005

(54) PC CARD MOTION DETECTOR

(75) Inventor: James Larry Peacock, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 10/040,131

(22) Filed: Jan. 2, 2002

(65) Prior Publication Data

US 2003/0135680 A1 Jul. 17, 2003

(51) Int. Cl.[7] ............................................. G06F 13/00
(52) U.S. Cl. ..................... 710/302; 361/752; 361/786; 361/787
(58) Field of Search .................................. 710/301, 302; 361/740, 741, 752, 754, 759, 760, 786, 787, 798

(56) References Cited

U.S. PATENT DOCUMENTS

| | | | |
|---|---|---|---|
| 4,071,722 A | * | 1/1978 | Hart ............................ 361/609 |
| 4,982,106 A | * | 1/1991 | Castellanet et al. ......... 307/120 |
| 4,999,787 A | | 3/1991 | McNally et al. |
| 5,157,771 A | | 10/1992 | Losi et al. |
| 5,210,855 A | | 5/1993 | Bartol |
| 5,310,998 A | * | 5/1994 | Okuno ........................ 710/302 |
| 5,317,697 A | | 5/1994 | Husak et al. |
| 5,386,567 A | | 1/1995 | Lien et al. |
| 5,473,499 A | | 12/1995 | Weir |
| 5,530,302 A | | 6/1996 | Hamre et al. |
| 5,568,610 A | | 10/1996 | Brown |
| 5,625,238 A | | 4/1997 | Ady et al. |
| 5,664,119 A | | 9/1997 | Jeffries et al. |
| 5,764,926 A | | 6/1998 | Fukuda et al. |
| 5,796,185 A | | 8/1998 | Takata et al. |
| 5,805,903 A | | 9/1998 | Elkhoury |
| 5,862,350 A | | 1/1999 | Coulson |
| 5,881,251 A | | 3/1999 | Fung et al. |
| 5,898,844 A | | 4/1999 | Thompson |
| 5,983,298 A | | 11/1999 | Schultz et al. |
| 6,069,796 A | | 5/2000 | Hastings et al. |
| 6,125,417 A | | 9/2000 | Bailis et al. |
| 6,138,194 A | | 10/2000 | Klein et al. |
| 6,182,173 B1 | | 1/2001 | Grosser et al. |
| 6,232,676 B1 | * | 5/2001 | Kozyra et al. .............. 710/302 |
| 6,381,146 B1 | * | 4/2002 | Sevier ........................ 361/754 |

OTHER PUBLICATIONS

"AL460 GX MP Server System Product Guide", pp. 65–70.

* cited by examiner

*Primary Examiner*—Glenn A. Auve
(74) *Attorney, Agent, or Firm*—Lieberman & Brandsdorfer, LLC

(57) ABSTRACT

A motion detector is provided that enables power to a computer module to be disconnected prior to removal of the module from the connector. Actuation of a sensor causes a shutter assembly to move vertically. The shutter assembly is in communication with a switch. Movement of the shutter assembly causes actuation of the switch to send a signal to a control circuit of an associated controller. Power to the controller is provided when the shutter assembly is in communication with the switch, and power is removed from the connector when the shutter assembly is not in communication with the switch.

17 Claims, 5 Drawing Sheets

US 6,928,504 B2

PC CARD MOTION DETECTOR

BACKGROUND OF THE INVENTION

1. Technical Field

This invention relates to an apparatus to monitor movement of a computer system module. More particularly, the invention relates to a sensor for controlling power to an interface between the module and the computer system.

2. Description of the Prior Art

It has become common for computers to be serviced while performing regular functions. A typical computer includes a main board, also referred to as a "motherboard", with a plurality of slots adapted to receive computer modules to expand the capacity and functionality of the computer. The demand for reliability in computer systems has led to the development of computer systems that support hot swapping of computer modules, including cards. This procedure allows a computer system to continue operating while a card is removed from the computer system or while a new card is inserted into the computer system. When one card is found to have a defective component or otherwise requires removal, the computer system can continue to function while the card is in the process of being removed, installed, or replaced. Accordingly, the process of hot swapping enables system components on any one of the cards to be removed, installed, or replaced without shutting down power from the computer system.

The process of hot swapping computer cards requires that power be removed from the card prior to removal from or insertion into the associated slot. One problem associated with hot swapping computer cards is the inadvertent removal of the wrong card. Given the layout of motherboards and the computer cards mounted in the associated connectors, the cards are commonly mounted close together and are often identical, or nearly identical in appearance. When the wrong card is removed, the power will not have been properly discontinued from the card prior to removal of the card from the associated connector. Removal of the computer card from the connector while the computer card is operating can have serious consequences on operation of the computer system. For example, the system is likely to continue waiting on an uncompleted process involving the inadvertently removed card. Such action can cause damage to both or either the computer card or the computer system in which the card has been operating. Accordingly, the prior art system provides the ability to hot swap computer cards without providing adequate safety measurements to ensure removal of the proper card while the system is operating.

One form of sensing movement of a computer card is shown in U.S. Pat. No. 6,138,194 to Klein et al. The '194 patent discloses a mechanical switch that is activated by a bus card when the bus card is mounted in an associated bus connector. When the card is fully inserted into the connector, the switch is in a depressed position. This positioning of the switch indicates the card is seated in the connector. When the card is removed from the connector, the switch returns to a raised position and a power switch removes power from the bus card. However, the mechanical switch is limited to a depressed position or a raised position. The Klein et al. patent does not provide a switch that detects motion of the card that may occur outside the realm of insertion or removal of the card from the connector. Accordingly, the mechanical switch in combination with the power switch does not provide the ability to remove power from the bus card during an initial movement of the card, such as movement associated with vibration.

There is therefore a need for an apparatus and method for detecting motion of a computer card and for removing power from the card experiencing the motion.

SUMMARY OF THE INVENTION

This invention comprises a detector for a computer module. The detector senses motion of a computer module prior to removal from an associated connector.

A first aspect of the invention is a detector with a sensor to detect motion of a computer module, and a switch to manage delivery of power to a connector holding the module. Initial motion of the module prior to disconnect of the card from the connector activates the switch. A sensor actuator is preferably provided to engage a shutter assembly actuator. A shutter assembly is preferably provided to communicate with the shutter assembly actuator and the switch. Actuation of the sensor preferably activates the shutter assembly actuator and vertically adjusts the shutter assembly to alter communication of the shutter assembly with the switch. The switch preferably sends a signal to a control circuit of the connector in response to movement of the shutter assembly. Preferably, the control circuit provides power to the connector when the shutter assembly is in communication with the switch and removes power from the connector when communication of the switch and the shutter assembly is removed. The sensor may be calibrated to detect motion of an adjacent computer module of about 0.005". The switch may be optical, magnetic, or mechanical, and the actuator may be ratchet teeth, a pin, a magnet, or an electro-magnet.

A second aspect of the invention is a method for detecting motion of a computer module through a sensor. Power to a connector holding the module is disconnected upon motion of the module prior to disconnecting the module from the connector. The sensor preferably includes a shutter assembly in communication with a power switch of the connector. A signal is preferably sent to a control circuit of the connector in response to actuation of the sensor. The step of sending a signal to the control circuit preferably includes providing power to the connector when the shutter assembly is in communication with the switch and disconnecting power from the connector when communication of the shutter assembly with the switch is removed. The switch may be calibrated to detect motion of about 0.005". The switch may be optical, magnetic, or mechanical, and the actuator may be ratchet teeth, a pin, a magnet, or an electro-magnet.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Computers and the associated motherboards are generally designed with a plurality of connectors for receiving computer cards. In general, most motherboards have the connectors aligned in a specific area. The computer case is complementary to the design of the motherboard so that the connectors of the motherboard are accessible from a specific area of the case. This enables an operator to hot swap computer cards without removing the case and exposing the motherboard. Alternatively, this enables an operator to secure any required accessories to a receiving end of the card. With recent advances in technology, motherboards are being configured to closely align computer cards. Accordingly, computer cards are arranged in such a manner that it is not uncommon to inadvertently remove a card that is still in operation in place of a card that has had power removed therefrom in anticipation of removal from the motherboard.

Technical Details

Figure 1:
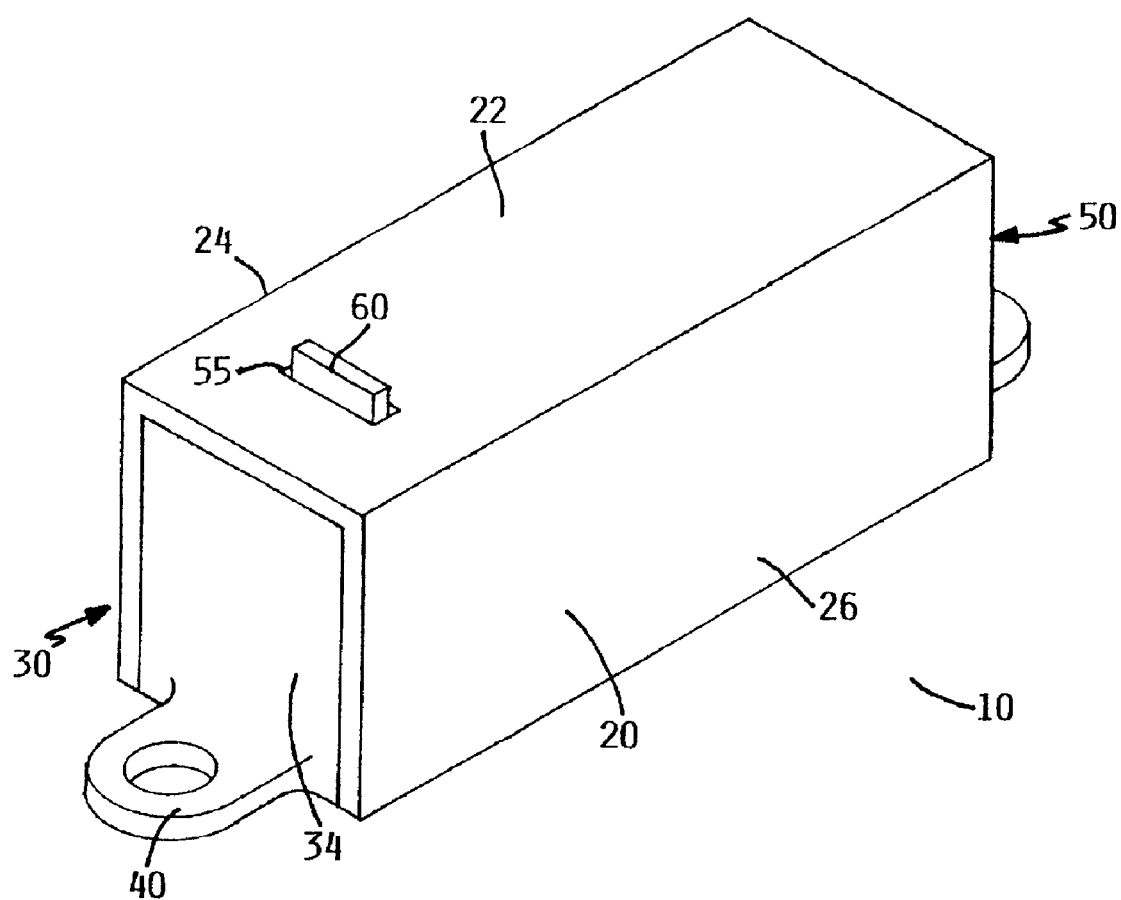
FIG. 1 is a perspective view of a motion detector enclosed within a housing taken from the left side.

FIG. 1 is a perspective view of the detector 10 enclosed within a housing 20. The housing 20 encloses the internal components of the detector 10 to prevent damage thereto. The housing has four sides 22, 24, 26 and 28 that enclose the top, left, right, and distal sides of the detector 10, respectively. The bottom side of the detector 10 has a base 40 that extends from the proximal end 30 to the distal end 50, and from the left side 24 to the right side 26. The proximal end 30 of the detector 10 has a vertical wall 34 that extends from the base 40 of the detector 10 to the top side 22 of the housing 20. The top side 22 of the housing 20 has an opening 55 for receiving a sensor 60. When maintenance of any of the parts of the detector 10 becomes necessary, the housing 20 may be removed from the detector without affecting and/or contacting any of the internal components thereof. Accordingly, the housing 20 provides a protective cover for the components of the detector 10 and is removable from the base 40 without contact with the internal components of the detector.

Figure 2:
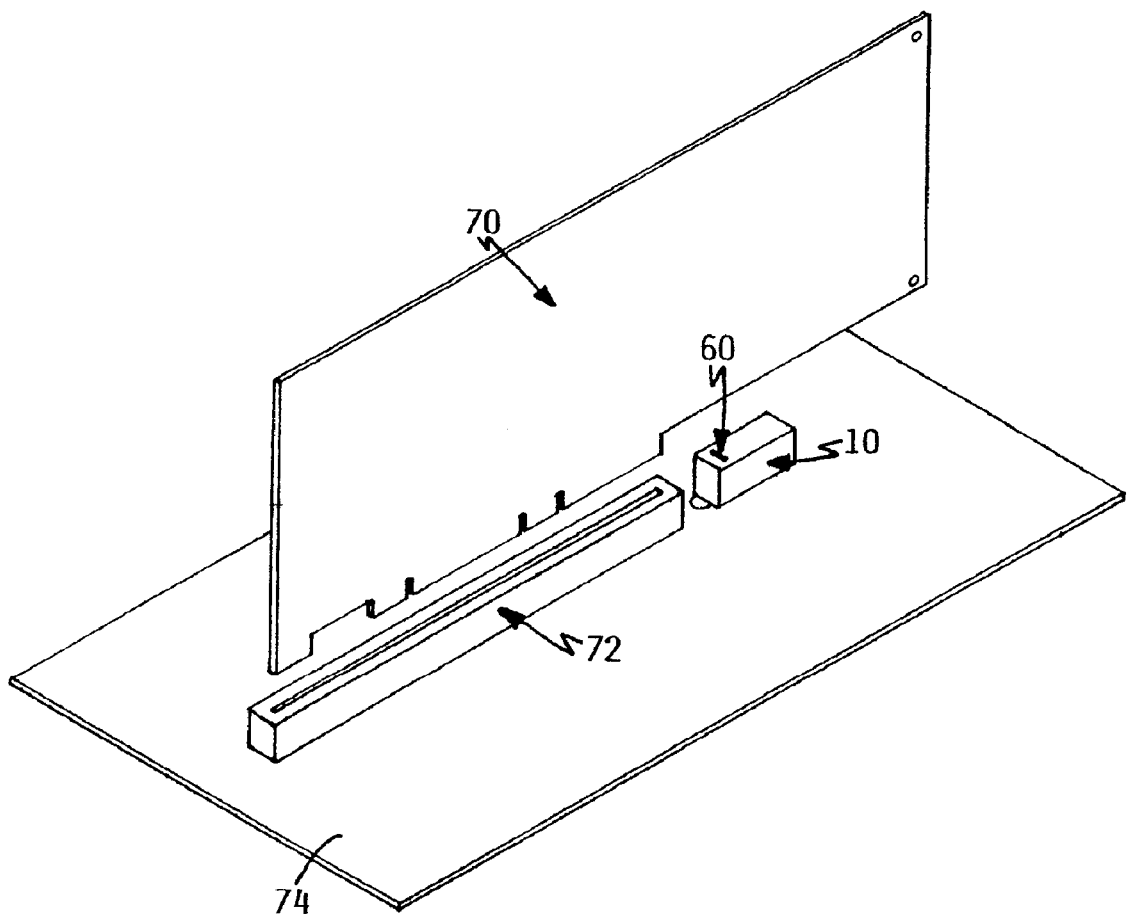
FIG. 2 is a perspective view of a computer card placed in a connector taken from the left side.

FIG. 2 is a perspective view of a computer card 70 being placed in a connector 72 of a motherboard 74. The detector 10 is shown positioned adjacent to the connector 72. The detector 10 is enclosed by the housing 20, with a portion of the base 40 and a top portion of the sensor 60 exposed. The exposed portion of the base 40 can either be directly mounted to the card 70 or built into the connector 72. Regardless of the mounting position of the detector 10, it remains stationary and securely positioned following placement of the card 70 in the connector 72.

Figure 3:
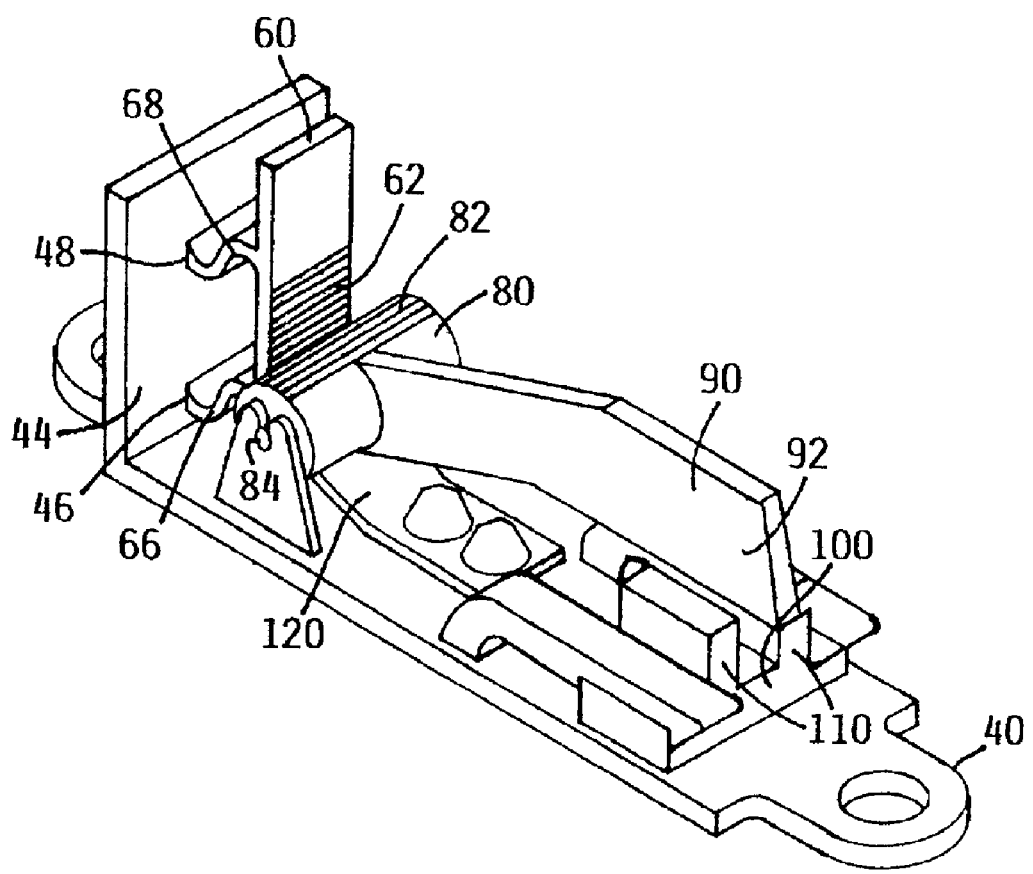
FIG. 3 is a perspective view of a motion detector taken from the right side, and is suggested for printing on the first page of the issued patent.

FIG. 3 is a perspective view of the detector 10 with the housing removed. All components of the detector 10, with the exception of the sensor 60 and the base 40 are enclosed within a housing. The base 40 of the detector 10 is a horizontal and generally planar surface that may be mounted to the computer card or built directly into the connector. The proximal end of the base 40 has a vertical wall 44 with openings 46 and 48 therein adapted for receiving the sensor 60 and securing the sensor 60 to the detector 10. The side of the sensor 60 adjacent to the vertical wall 44 has a set of clamps 66 and 68 for securing the sensor 60 to the openings 46 and 48 of the vertical wall 44. The sensor 60 may be replaced by detaching the clamps 66 and 68 from the openings 46 and 48, and securing a new sensor to the wall 44. Accordingly, the sensor 60 of the detector 10 may be replaced if replacement becomes necessary.

The front side of the sensor 60 has an actuator. In this illustration, the actuator is shown in the form of ratchet teeth embedded within the exterior surface thereof. The ratchet teeth 62 of the sensor 60 are adapted to contact an adjacent actuator 80 of a shutter assembly 90. In this illustration, the shutter assembly actuator 80 is shown in the form of a cylinder 80 that has complementary ratchet teeth 82 mounted on it's exterior surface. The cylinder 80 is connected to a shutter assembly 90 in communication with a switch 100 for controlling power to an associated connector. Accordingly, vertical movement of the sensor 60 causes a rotation of the cylinder 80 through meshing of the complementary ratchet teeth 62, 82, which communicate with the connector through the switch 100 to control delivery of power to the computer card mounted in or in the process of being removed from the connector.

Figure 4:
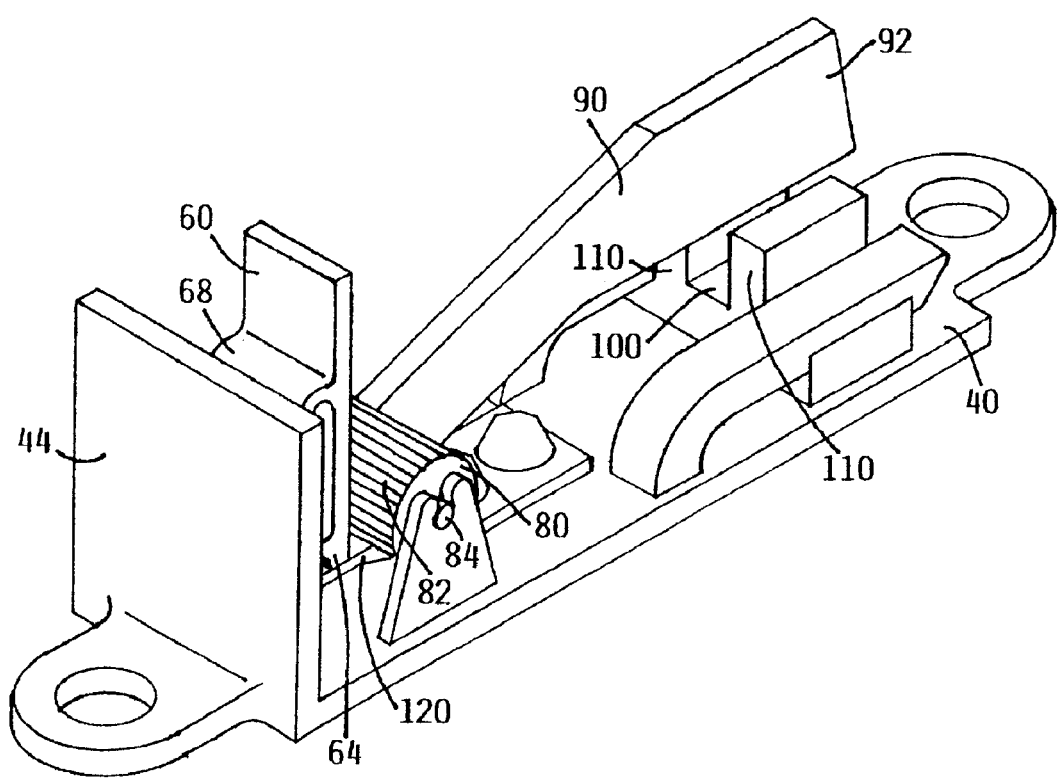
FIG. 4 is perspective view of a motion detector taken from the left side.
Figure 5:
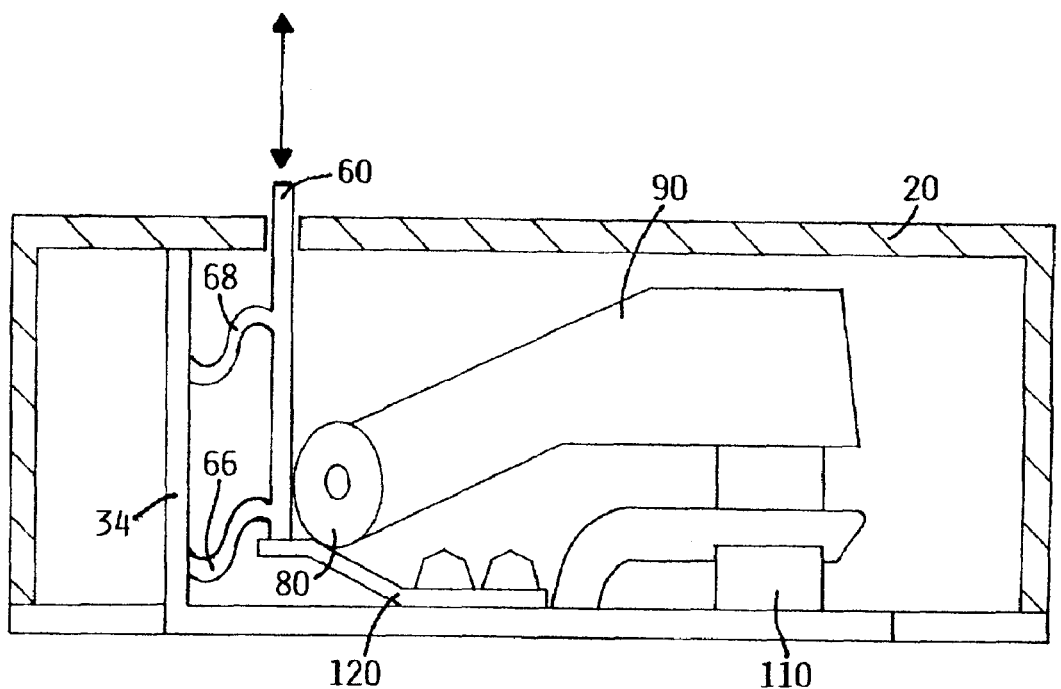
FIG. 5 is a front sectional view of a motion detector.

FIG. 4 is a perspective view of the detector 10 taken from the left side. A proximal end of the shutter assembly 90 is mounted to the cylinder 80 to enable communication between the sensor 60 and the switch 100. The shutter assembly extends from the cylinder 80 to the switch 100. When the distal end of the shutter assembly 92 is raised, the switch 100 provides power to the connector. Similarly, when the distal end of the shutter assembly 92 is lowered and received by a blade 110 power to the connector is removed. Movement of the shutter assembly 90 is in response to movement of the sensor 60, which may be caused by movement of the card or connector. The lower end 64 of the sensor is in communication with a spring 120. A downward vertical movement of the sensor 60 is resisted by the tension in the spring 120 that presses against the lower surface of the sensor 64. The spring 120 holds the sensor 60 in tension. When an object in contact with the exposed portion of the sensor 60 moves, the sensor 60 responds accordingly. FIG. 5 illustrates the motion of the sensor 60 and the corresponding motion of the shutter assembly 90. Motion of the card causes motion of the sensor 60, which causes the teeth 62 of the sensor 60 to mesh with the teeth 82 of the cylinder 80, and forces rotation of the cylinder 82 about it's shaft 84. Rotation of the cylinder causes vertical motion of the shutter assembly 90. If a card is in process of being placed in the connector, the sensor 60 is depressed and the shutter assembly 90 is raised from the blade 110 and the switch allows power to be provided to the connector. Once the shutter assembly reaches the top side 22 of the housing 20, or another stop element, further movement of the sensor 60 slips past the shutter assembly 90. The interface of the sensor 60 and the cylinder 80 is uni-directional. The slip element subsequent to activation of the sensor enables the sensor 60 to be relatively tolerant of the space between the base 40 and the surface of the object whose motion is being detected. Similarly, if the card moves in any direction and causes the sensor 60 to move, the shutter assembly 90 is lowered into the blade 110 and power to the connector is disconnected. Accordingly, the process of raising and lowering the shutter assembly 90 controls the provision of power to the connector.

Any movement of the shutter assembly 90 is determined by the sensitivity of the motion detector assembly. The sensitivity of motion of the shutter assembly 90 is determined by the ratio of the distance from the shutter assembly pivot point to the interface of the sensor actuator 62 and shutter assembly actuator 82, and the distance from the shutter assembly pivot point to the detector portion of the switch 100. This ratio can be modified to achieve the desired sensitivity. If the length of the shutter assembly 90 remains constant and the radius of the cylinder 80 is increased, the sensitivity of the detector is reduced. Similarly, if the length of the shutter assembly 90 remains constant and the radius of the cylinder 80 is reduced, the sensitivity of the detector 10 is increased. In addition, placement of the switch 100 in relation to the length of the shutter assembly 90 will affect the sensitivity of the detector 10. In a preferred embodiment of the invention, the detector 10 is calibrated to detect motion of an object in communication with the sensor 60 of up to 0.005". This level of sensitivity enables the power to the computer card to be shut-down in response to fine measurements of motion before electrical contact is broken by complete removal of the card from the connector. The level of sensitivity removes power from the connector associated with movement of the card providing a warning to the computer system of any problems associated with a card in a particular connector. Accordingly, the sensitivity associated with the assembly of the detector 10 provides a warning to the computer system and enables power to an associated connector to be removed before damage to the card and/or computer system occurs.

The detector 10 illustrates the use of an optical switch 100 positioned between the blades 110. The optical switch 100 is connected to the computer card by a wire or contacts on the bottom of the housing 20. When the card is placed in the connector, the shutter assembly 90 is raised out of the blades 110. This enables the optical switch 100 to send a light beam to the power supply of the connector. When the shutter assembly 90 is is lowered into the blades 110, the shutter assembly 90 breaks the light beam and power to the connector is removed. Accordingly, the use of the optical switch 100 enables the shutter assembly 90 to control the provision of power to the connector of the computer card.

Advantages Over the Prior Art

The detector provides an apparatus to detect separation of the computer card from the associated connector. The sensitivity of the apparatus is calibrated to detect motion of an object in contact with the sensor of up to 0.005". This enables the detector to detect small movements of objects, and to provide a warning signal of an impending disconnect of the card. The detector is not limited to insertion and removal of the computer card to and from the connector. Rather, the detector may be implemented for determining vibrations of the card, computer, and/or tampering with the card or another accessory of the computer. The sensitivity of the detector may be adjusted for the particular environment and the desired affects. Accordingly, the detector enables detection of any movement of a computer card and provides a warning to the system of such movement by removing power from the connector associated with the card prior to card removal and prior to damage to the card, motherboard, and/or connector contacts.

Alternative Embodiments

It will be appreciated that, although specific embodiments of the invention have been described herein for purposes of illustration, various modifications may be made without departing from the spirit and scope of the invention. In particular, the switch 100 in the preferred embodiment is an optical switch. However, the switch may also be in the form of a magnetic read switch, in which the shutter assembly 90 has a magnet mounted thereon. When the shutter assembly 90 is in a lowered position, the magnetic read switch sends out a charge to the connector which supplies power to the computer card. Similarly, when the shutter assembly 90 is in a raised position, the magnetic read switch ceases sending a charge to the connector and power to the computer card is shut-down. In addition, the switch 100 may be a mechanical switch in which the shutter assembly 90 presses on a contact or electric charge to communicate with the power supply of the connector. The detector may be used to detect connectors that are separating from the motherboard. Separating connectors cause the card mounted therein to move which actuates the sensor 60 of the detector 10. Both the cylinder 80 and the sensor 60 may be provided without ratchet teeth on the respective exterior surfaces. In addition, the cylinder 80 may be removed from the detector and replaced with one of the following: a pin that extends from the sensor 60 to a pivot point of the shutter, or a spring that extends from the sensor 60 to the pivot point of the shutter assembly. The sensor could be comprised of a magnetic material and the cylinder could have a magnet or electromagnet inside with an opposite polarity of the material of the sensor. In the case of an electromagnet, power to the detector may be remotely activated while allowing gravity to maintain the switch in an on position. Accordingly, the scope of protection of this invention is limited only by the following claims and their equivalents.

I claim:

1. A detector comprising:
    a sensor to detect motion of a computer module, wherein said sensor is calibrated to detect motion of said module of about 0.005"; and
    a switch to manage delivery of power to a connector holding said module, wherein initial motion of said module prior to disconnect from said connector activates said switch and said sensor is external to said connector.

2. The detector of claim 1, further comprising a sensor actuator adapted to engage a shutter assembly actuator.

3. The detector of claim 2, further comprising a shutter assembly in communication with said shutter assembly actuator and said switch.

4. The detector of claim 3, wherein actuation of said sensor activates said shutter assembly actuator and vertically adjusts said shutter assembly to alter communication of said shutter assembly with said switch.

5. The detector of claim 4, wherein said switch sends a signal to a control circuit of said connector in response to movement of said shutter assembly.

6. The detector of claim 5, wherein said control circuit provides power to said connector when said shutter assembly is in communication with said switch.

7. The detector of claim 5, wherein said control circuit removes power from said connector when communication of said shutter assembly with said switch is removed.

8. The detector of claim 2, wherein said actuator is selected from the group consisting of: ratchet teeth, a pin, a spring, a magnet, an electro-magnet, and combinations thereof.

9. The detector of claim 1, wherein said switch is selected from the group consisting of: an optical switch, a magnetic switch, and a mechanical switch, and combinations thereof.

10. A method for detecting motion, comprising:
    (a) detecting motion of a computer module in cummunication with a connector through a sensor, wherein said sensor is external to said connector; and
    (b) disconnecting power from said connector holding said module upon motion of said module prior to disconnecting said module from said connector; and
    (c) calibrating said sensor to detect motion of about 0.005".

11. The method of claim 10, wherein said sensor includes a shutter assembly in communication with a power switch of said connector.

12. The method of claim 11, further comprising the step of sending a signal to a control circuit of said connector in response to actuation of said sensor.

13. The method of claim 12, wherein the step of sending a signal to said control circuit includes providing power to said connector when said shutter assembly is in communication with said switch.

14. The method of claim 12, wherein the step of sending a signal to said control circuit includes disconnecting power from said connector when communication of said shutter assembly with said switch is removed.

15. The method of claim 11, wherein said switch is selected from the group consisting of: an optical switch, a magnetic switch, a mechanical switch, and combinations thereof.

16. A motion detector comprising:
- a sensor to mechanically detect motion of a computer module, wherein said sensor is calibrated to detect motion of said module of about 0.005";
- a switch to manage delivery of power to a connector holding said module, wherein initial motion of said module prior to disconnect from said connector activates said switch;
- a sensor actuator adapted to engage a shutter assembly actuator; and
- a shutter assembly in communication with said shutter assembly actuator and said switch to communicate motion of said module with said switch.

17. The detector of claim 16, wherein said actuator is selected from the group consisting of: ratchet teeth, a pin, a spring, a magnet, an electro-magnet, and combinations thereof.

* * * * *